(12) United States Patent
Rodney et al.

(10) Patent No.: US 9,151,864 B2
(45) Date of Patent: Oct. 6, 2015

(54) MONITORING AND DETECTION OF MATERIALS USING HYPERSPECTRAL IMAGING

(75) Inventors: Paul Rodney, Spring, TX (US); Michael Pelletier, Houston, TX (US); Christopher Michael Jones, Houston, TX (US); Derrick Lewis, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 581 days.

(21) Appl. No.: 13/427,734

(22) Filed: Mar. 22, 2012

(65) Prior Publication Data

US 2012/0242822 A1    Sep. 27, 2012

Related U.S. Application Data

(60) Provisional application No. 61/466,881, filed on Mar. 23, 2011.

(51) Int. Cl.
*G01V 8/10* (2006.01)
(52) U.S. Cl.
CPC ....................................... *G01V 8/10* (2013.01)
(58) Field of Classification Search
None
See application file for complete search history.

(56) References Cited

U.S. PATENT DOCUMENTS

| 5,528,295 | A | 6/1996 | Wagner | 348/269 |
| 2003/0025081 | A1* | 2/2003 | Edner et al. | 250/339.09 |
| 2008/0233523 | A1* | 9/2008 | Diepenbroek et al. | 431/14 |
| 2010/0243241 | A1* | 9/2010 | Hampton et al. | 166/250.01 |
| 2011/0052019 | A1* | 3/2011 | Moshe | 382/128 |

FOREIGN PATENT DOCUMENTS

| EP | 1862795 | 12/2007 |
| GB | 2225110 | 5/1990 |
| WO | WO02/061239 | 8/2002 |

OTHER PUBLICATIONS

Search Report in Application Serial No. PCT/US2011/029666, Feb. 2, 2012.
Yunjun Zhan et al., "Hyperspectral Remote Sensing Rock and Mineral Spectral Feature Mining Based on Rough Set Theority", Computer Science and Software Engineering, 2008 Internation Conference, IEEE, Piscataway, NJ, USA, Dec. 12, 2008.

* cited by examiner

*Primary Examiner* — Joseph Ustaris
*Assistant Examiner* — Kevin McInnish
(74) *Attorney, Agent, or Firm* — Alan Bryson; Baker Botts L.L.P.

(57) ABSTRACT

Apparatus and methods for imaging and characterizing materials when performing subterranean operations are disclosed. A method for analyzing gaseous emissions from a subterranean formation comprises positioning a hyperspectral image capturing mechanism to monitor an area of interest and detecting presence of one or more materials of interest in the area of interest using the hyperspectral image. The amount of the one or more materials of interest in the area of interest is then quantified.

4 Claims, 5 Drawing Sheets

MONITORING AND DETECTION OF MATERIALS USING HYPERSPECTRAL IMAGING

PRIORITY CLAIM

This applications claims benefit of U.S. Provisional Patent Application Ser. No. 61/466,881, filed on Mar. 23, 2011.

BACKGROUND

Hydrocarbons are typically obtained from earth formations by performing subterranean operations. These subterranean operations often involve a number of processes and components. Safety is an important consideration when performing subterranean operations. For instance, hydrocarbons often evolve from the various components used in performing subterranean operations. It is desirable to be able to monitor and/or quantify the amount of hydrocarbons being emitted from a component or subsystem utilized in performing subterranean operations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to hyperspectral imaging and, more particularly, to apparatus and methods for imaging and characterizing materials when performing subterranean operations.

For purposes of this disclosure, hyperspectral imaging refers to a process for collecting and/or processing information from across all or a portion of the electromagnetic spectrum. A hyperspectral imaging device is a device that can capture an image of a region of interest that reflects the visible light from that region as well as other electromagnetic components emanating from the region, from ultraviolet to infrared.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

A hyperspectral image may be captured using a Hyperspectral Image Capture Mechanism ("HICM"). The general operation of a HICM is known to those of ordinary skill in the art and will not be discussed in detail herein. As would be appreciated by those of ordinary skill in the art, with the benefit of this disclosure, the HICM may be placed at any suitable location in the system, depending on the particular application. The operator may control the operation of the HICM to capture an image that is best suited for the intended analysis.

For instance, the operator may zoom in the HICM to obtain an image with a high resolution or may zoom out to capture a lower resolution image of a wider area. The focusing techniques required to change the resolution of the images and/or the area captured in each image are well known to those of ordinary skill in the art and will not be discussed in detail herein. Additionally, the operator may modify the sampling rate of the HICM. As would be appreciated by those of ordinary skill in the art, with the benefit of this disclosure, the sampling rate of the HICM should be high enough so that blurring due to motion does not significantly degrade any captured images. Specifically, HICM permits a continuous monitoring of a desired region and has the ability to capture hyperspectral images of the region of interest at a rate that is in a range of between, for example, one image per approximately 1 second and $1/128$th of a second. In one embodiment, the sampling rate may be $1/100$th of a second. Image capture occurs within a time window and is repeated at a certain rate. The time window should be short enough to avoid blurring. The sample rate can be as high as the inverse of the time window. For instance, the time window may be as high as 1 second and as short as $1/128^{th}$ of a second while the sample rate may be as low as one sample per second or as high as 128 samples/second. However, the sampling rate of the HICM may be limited by the processing capabilities of the system. In one embodiment, the distance and optics of the HICM 130 may be chosen such that 0.5 mm can be easily resolved in the captured images.

In one exemplary embodiment, the HICM and the portion of the system where images are to be captured may be contained in an enclosure to isolate the image capturing region from ambient light. The portion of the system that is imaged may then be illuminated with a light of known spectral content, such as, for example, fluorescent light. Further, in one exemplary embodiment, the operator may illuminate the imaged region with a light of known spectral content to look for one or more specific materials. The term materials, as used herein, may refer to any desirable gaseous, solid, or fluid materials that are to be tracked, traced, characterized, or otherwise monitored. As would be appreciated by those of ordinary skill in the art, with the benefit of this disclosure, X-ray, Ultraviolet, Infrared or other optical bands may be used. In one exemplary embodiment, the wavelength of the light source used may be selected from the range between 0.1 [nm] and 2000 [nm].

The images captured by the HICM may be processed for lithology identification and shape analysis. Suppose that there are h hyperspectral wavelength ranges designated by the set A. For true hyperspectral imaging, the elements of A should be contiguous, i.e., A should be of the form:

$$A=\{(\lambda_0,\lambda_1),(\lambda_1,\lambda_2),(\lambda_2,\lambda_3)\ldots,(\lambda_{h-1},\lambda_h)\}$$

where the $(\lambda_i, \lambda_j)$ designates a wavelength interval from $\lambda_i$ to $\lambda_j$ where $\lambda_i < \lambda_j$ when $i<j$. Since the material identification and shape analysis need not be tied to hyperspectral imaging, the definition of A will be generalized somewhat to $$A=\{(\lambda_{L1},\lambda_{R1}),(\lambda_{L2},\lambda_{R2}),(\lambda_{L3},\lambda_{R3})\ldots,(\lambda_{Lh},\lambda_{Rh})\}$$

where $$\lambda_{Li} < \lambda_{Ri}.$$

Each image will be referred to as a frame.

The frames will be assumed to be rectangular images having M+1 by N+1 pixels for each of the h hyperspectral components. Since it somewhat simplifies the notation, M and N will be assumed to be even. The indices for a pixel will range from $-M/2$ to $M/2$ by $-N/2$ to $N/2$. A total of F consecutively sampled frames will be processed simultaneously as will be described below. Once F frames have been processed, the oldest frame can be discarded and a new frame added to the set for processing, or an additional F frames can be acquired for processing. The old frames can be stored in a memory storage for later reference or for retrieval for further processing at a later time.

Figure 1:
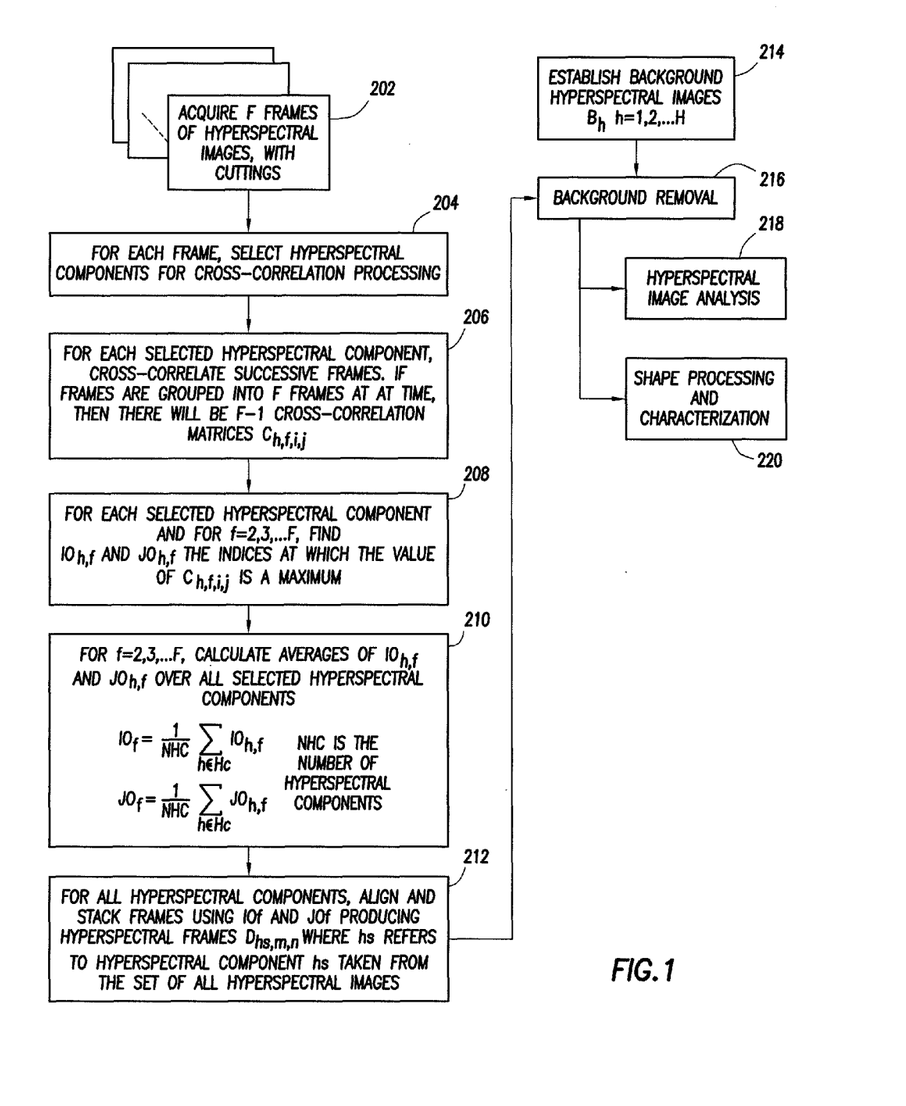
FIG. 1 shows a process for hyperspectral analysis and shape analysis of images in accordance with an exemplary embodiment of the present invention.

In one exemplary embodiment, a first step in the processing may be to acquire and stack multiple images so as to improve the signal to noise ratio. FIG. 1 depicts an exemplary process for acquiring and stacking multiple images in accordance with an exemplary embodiment of the present invention. As shown in FIG. 1, at step 202, the HICM may be used to acquire F frames of hyperspectral images with the material of interest. Next, at step 204, for each of the F frames a hyperspectral component may be selected for cross-correlation processing. At step 206, for each selected hyperspectral component, successive frames are cross-correlated. Accordingly, as would be appreciated by those of ordinary skill in the art, with the benefit of this disclosure, if the frames are grouped into F frames at a time, then there will be F−1 cross-correlation matrices, $C_{h,f,i,j}$. Next, at step 208, for each hyperspectral component and for f=2, 3, . . . , F, find $I0_{h,f}$ and $J0_{h,f}$, the indices at which the value of $C_{h,f,i,j}$ is a maximum. At step 210, for f=2, 3, . . . , F, the averages of $I0_{h,f}$ and $J0_{h,f}$ are calculated over all selected hyperspectral components as:

$$I0f = \frac{1}{NHC} \sum_{h \in HC} I0h, f$$

$$J0f = \frac{1}{NHC} \sum_{h \in HC} J0h, f$$

where NHC is the number of hyperspectral components. Once the averages of $I0_{h,f}$ and $J0_{h,f}$ are calculated, at step 212, $I0_f$ and $J0_f$ may be used to align and stack frames for all hyperspectral components, producing hyperspectral frames $D_{hs,m,n}$, where hs represents the hyperspectral component hs taken from the set of all hyperspectral images. Additionally, at step 214, background hyperspectral images may be established as $B_h$, where h=1, 2, . . . , H. Using the outputs from steps 212 and 214, the background may then be removed at step 216.

With the background image removed at step 216, the hyperspectral image analysis may be performed at step 218 and shape processing and characterization may be performed at step 220. As would be appreciated by those of ordinary skill in the art, with the benefit of this disclosure, although FIG. 1 depicts a number of steps for processing images, many of the steps depicted therein are optional and same or similar results may be achieved by eliminating one or more of the recited steps or by replacing each step with another step that may carry out equivalent operations.

In certain embodiments, the background removal of step 216 may be performed before cross-correlation processing of step 204. Accordingly, background hyperspectral images may be established (as described in conjunction with step 214 above) before (or after) acquiring frames of the hyperspectral images of the cuttings (step 202). The process can then proceed to step 216 for background removal before proceeding to step 204 for cross-correlation. In this embodiment, the process may proceed from step 212 directly to step 218 (for hyperspectral image analysis) or to step 220 (for shape processing and characterization) since the background removal is performed in advance. As would be appreciated by those of ordinary skill in the art, with the benefit of this disclosure, performing background removal prior to cross-correlation processing of step 204 may improve the results of the cross-correlation process.

Further, it is desirable, but not necessary to establish a background image of the area where a material of interest will pass prior to acquiring images of the area, or to acquire such an image at a time when the material of interest is not present. Because the background is present to some extent in all images, it is advantageous from a signal to noise perspective to remove it from all of the frames. For instance, when analyzing a gas in ambient air, the ambient air may be used as a control sample to perform differential work on the images of the material of interest captured by the HICM to distinguish the portion of the captured image that corresponds to the materials of interest from the background. Accordingly, once a clean background image has been identified, F frames of hyperspectral images of the materials of interest may be obtained. Hyperspectral image analysis and shape analysis is possible with the images from individual frames. However, the signal to noise ratio may be improved by processing multiple frames. In instances where it is desirable to utilize background removal, the background may be removed from all frames of the hyperspectral image before the frames are subjected to further processing. In accordance with certain embodiments, the background may be removed from each hyperspectral component in a given frame.

In one exemplary embodiment, before processing the hyperspectral images of the materials of interest, a set of hyperspectral components may be selected for correlation processing in order to provide a means for aligning successive frames and stacking or averaging them. It is therefore preferred that the components selected be present at a level significantly above the background noise level. In one embodiment, the selected components may be present at a level of at least 3 [dB] above the background noise level. Accordingly, a total of SC hyperspectral components have been selected. A set of such hyperspectral components may be defined as:

$$HC=(hc_1,hc_2,\ldots,hc_{SC})$$

For each hyperspectral component, successive frames may be cross-correlated. In one exemplary embodiment cross-correlation may only be performed on a selected subimage of each frame and not on the entire image. As would be appreciated by those of ordinary skill in the art, with the benefit of this disclosure, performing the cross-correlation only on a selected subimage of each frame may have several advantages. First, it may simplify the calculation of the two-dimensional cross-correlation function (to be defined below). Moreover, doing so may reduce the computation time and result in a larger portion of each image being available for hyperspectral and shape processing. The cross-correlation process requires some overlap of images. As would be appreciated by those of ordinary skill in the art, with the benefit of this disclosure, if small sections are cross-correlated across large sections, a larger portion of the image can be covered by the cross-correlation than if large sections are cross-correlated with large sections.

As would be appreciated by those of ordinary skill in the art, with the benefit of this disclosure, there are many ways of defining a two-dimensional cross-correlation function. In one exemplary embodiment, two even integers may be selected. The image intensities in frame f in a specific hyperspectral interval h may be designated as $I_{h,f,i,j}$, where:

$$h \in HC$$
$$-\frac{M}{2} \leq i \leq \frac{M}{2}$$
$$-\frac{N}{2} \leq j \leq \frac{N}{2}$$

Then the cross-correlation between frames f−1 and f for hyperspectral components h is defined as $$C_{h,f,i,j} = \sum_{jj=-Q/2}^{Q/2} \sum_{ii=-P/2}^{P/2} (I_{h,f-1,ii,jj} - \overline{I_{h,f-1}}) \cdot (I_{h,f,i+ii,j+jj} - \overline{I_{h,f}})$$

where:
$$\frac{P}{2} - \frac{M}{2} \leq i \leq \frac{M}{2} - \frac{P}{2}$$
$$\frac{Q}{2} - \frac{N}{2} \leq j \leq \frac{N}{2} - \frac{Q}{2}$$

and the averages over hyperspectral component h in frames f−1 and f, respectively, may be obtained $$\overline{I_{h,f-1}} = \frac{1}{(M+1)\cdot(N+1)} \sum_{j=-N/2}^{N/2-1} \sum_{i=-M/2}^{M/2-1} I_{h,f-1,i,j}$$

$$\overline{I_{h,f}} = \frac{1}{(M+1)\cdot(N+1)} \sum_{j=-N/2}^{N/2-1} \sum_{i=-M/2}^{M/2-1} I_{h,f,i,j}$$

Generally, the hyperspectral images in frame f are displaced versions of the hyperspectral images in frame f−1, the displacement being common to all hyperspectral components. This displacement is due to motion of the materials of interest. Because of the choice of indices, if the particles are not moving, $C_{h,f,i,j}$ achieves a maximum at i=0 and j=0. If frame f has been displaced from frame f−1 by $I0_{h,f}$ pixels in the i index and $J0_{h,f}$ pixels in the j index, then the correlation peak will be at element:

$$C_{h,f,-I0_{h,f},-J0_{h,f}}$$

and the two images can be aligned by offsetting the indices in image f by $-I0_{h,f}$ and $-J0_{h,f}$. In one exemplary embodiment, the images may be realigned so that they can be stacked by adding the intensities in realigned images. Because the image boundaries are finite, it may not be possible to combine all elements of both images after shifting. There are well known techniques available to those skilled in the art for taking the finite nature of the image boundaries into account.

If more than one hyperspectral component h is used for the correlation analysis, then the average shift indices may be calculated as:

$$I0_f = \frac{1}{NHC} \sum_{h \in HC} I0_{h,f}$$

$$J0_f = \frac{1}{NHC} \sum_{h \in HC} J0_{h,f}$$

where NHC is the number of elements in HC. Next, the images of all of the hyperspectral components of frame f may be aligned with those of f−1 and the two may be added or averaged. This process may be repeated with appropriate shifting to align and stack all F images if desired. The stacked images may be designated as $D_{hs,i,j}$ where hs indicates an element from the set of all hyperspectral wavelengths, A. For each hs, the following relationship is applicable to the i and j components of $D_{hs,i,j}$:

$$\frac{P}{2} - \frac{M}{2} \leq i \leq \frac{M}{2} - \frac{P}{2}$$

In one exemplary embodiment, an additional step may be carried out in order to remove the background over the same range of indices. As would be appreciated by those of ordinary skill in the art, with the benefit of this disclosure, background removal may not be a matter of simply subtracting all of the pixel values in the background images from all of the values in an image of interest. In fact, background removal is more a matter of knowing which pixel values to subtract. Exemplary methods of performing the background removal are well known to those of ordinary skill in the art and will not be discussed in detail herein. One such method is set forth in, for example, OBJECT TRACKING: A SURVEY, Alper Yilmaz, Omar Javed and Mubarak Shah, ACM Computing Surveys, Vol. 38, No. 4, Article 13, December 2006 (hereinafter "Yilmaz").

Accordingly, $D_{hs,i,j}$ may refer to an image in a spectral band hs whether or not it has been subjected to background removal. The typical hyperspectral imaging techniques may be applied to the full set of $D_{hs,i,j}$ for mineral identification across the image.

Analysis of images may be confined to a particular set of hyperspectral components of interest because of the correlation between these components and materials of interest, or the whole set of hyperspectral components, or a linear combination of hyperspectral frames, the linear combination selected because of the relative importance of the selected hyperspectral components for identification of a particular mineral of interest.

Figure 2:
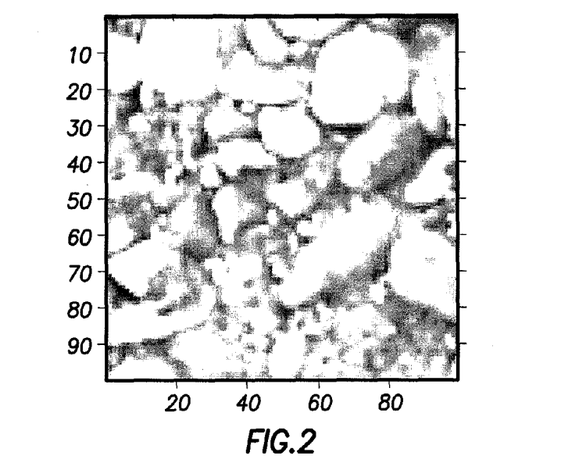
FIG. 2 depicts an image of a pebble bed captured using different spectral filters.
Figure 3:
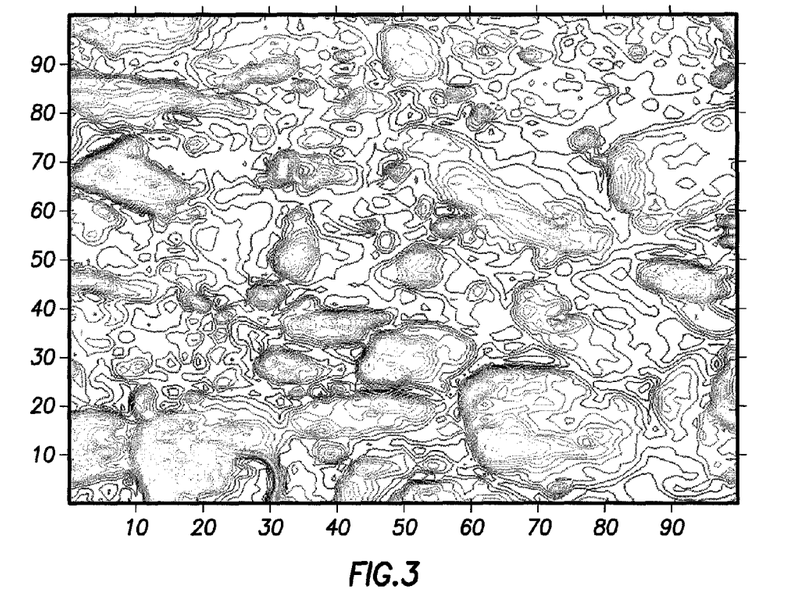
FIG. 3 is a contour plot of the pebble bed of FIG. 2.
Figure 4:
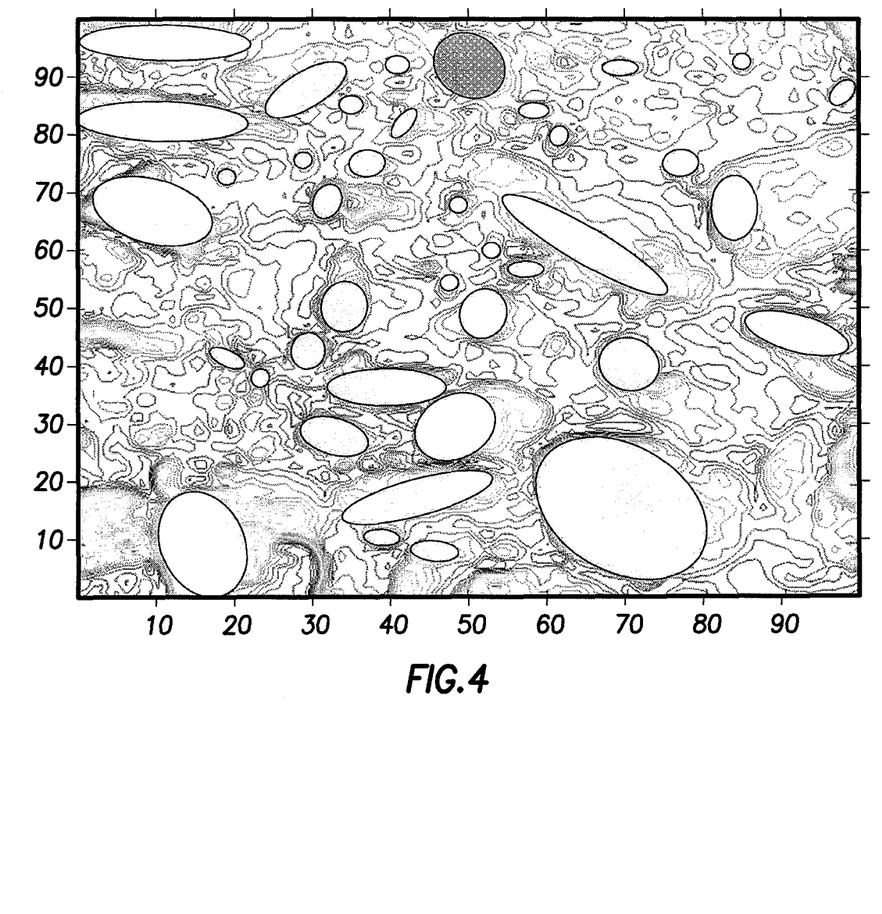
FIG. 4 shows how the contours of FIG. 3 may be approximated by ellipses.

There are several ways of analyzing the shapes of the materials of interest. Yilmaz provides a summary of some of these techniques. Some of these techniques such as contouring may be computer intensive while in other techniques, all shapes of interest may be approximated by a simple geometric shape, such as an ellipse. Parameters such as major axis, minor axis, and orientation are estimated for the ellipses, and statistical distributions of the parameters may be compiled to gain an understanding of the size and shape distribution of elements in each image. In another exemplary embodiment, the contours may be used to define closed regions which may then be approximated by geometric shapes. FIGS. 2, 3 and 4 depict images that may be produced using known methods such as those disclosed in Yilmaz. Specifically, FIG. 2 is an image of a pebble bed taken through a spectral filter. Contours of that image are shown in FIG. 3. As would be appreciated by those of ordinary skill in the art, with the benefit of this disclosure, the contours of FIG. 3 may be produced in a number of ways, such as, for example, using the Matlab™ software available from MathWorks of Natick, Mass. FIG. 4 shows how the contours may be approximated by ellipses using methods such as those disclosed in Yilmaz. Once the image is broken into such geometrical shapes, the mean dimensions of the shapes may be characterized and subjected to a variety of statistical measures.

Gaseous hydrocarbons often evolve from the different components on the oil field. For instance, they may evolve from shale shakers or mud pits. These gaseous hydrocarbons are not safe and are typically collected and directed to a stack where they are flared off. The combustion of these hydrocarbons may produces CO2, H2O, and CO as well as heat. It is often desirable to know the amount of gaseous hydrocarbons evolving from a system of interest, such as, for example, a rig site.

In one aspect, gaseous emissions, such as, for example, CO2, H2O and/or CO from a stack may be quantified using hyperspectral imaging and the information regarding the quantity of the gaseous emissions from the stack may be used to determine the amount of hydrocarbons being flared off. In one exemplary embodiment, this information may be used in conjunction with flare off heat analysis to improve the results and obtain two independent determinations of the amount of hydrocarbon gas being combusted. The performance of flare off heat analysis is known to those of ordinary skill in the art and will therefore not be discussed in detail herein.

Some of the gasses emitted from the stack such as, for example, CO2, H2O and/or CO may also be present in ambient conditions. Accordingly, in order to quantify the amount of such gasses that are emitted from the stack during flare off using hyperspectral imaging, in an exemplary embodiment of the present invention, the emitted gasses from the stack may be distinguished from the ambient gasses based on their temperature. In one exemplary embodiment, ambient concentrations of these materials may be determined prior to flaring or at a time when flaring has not been carried out for a period of time, such as, for example, for 30 minutes. The pre-flare hyperspectral image may then be used to provide a "background" image that may be used to identify the gasses that are emitted from the flare once a hyperspectral image of the flare is obtained.

In one embodiment of the present invention, the hyperspectral image may be used to obtain a wide field view of the volumetric flow rate (i.e. the total hydrocarbon gas coming from the well) which allows a detection of the volume of hydrocarbon gas per unit rock since the drilling rate is known. In another exemplary embodiment, a wide area view of the cutting samples from the shale shaker using hyperspectral imaging may be used to identify the cuttings that are emitting hydrocarbon gasses. This information may then be used to correlate the gas emission with the mineralogy of the cuttings.

In one embodiment, the present invention may include means for estimating flow rates of the materials being tracked and calculate the volumes of the materials being emitted.

In one exemplary embodiment, a set of background images may be taken prior to the presence of flaring, or at least at a time when flaring has not been carried out for a predetermined period of time, such as, for example, 30 minutes. This background may be taken with all or some of the hyperspectral cameras used in the system. In one exemplary embodiment, at least two hyperspectral cameras may be used so as to provide different perspectives of the effluents being produced by the combustion.

Figure 5:
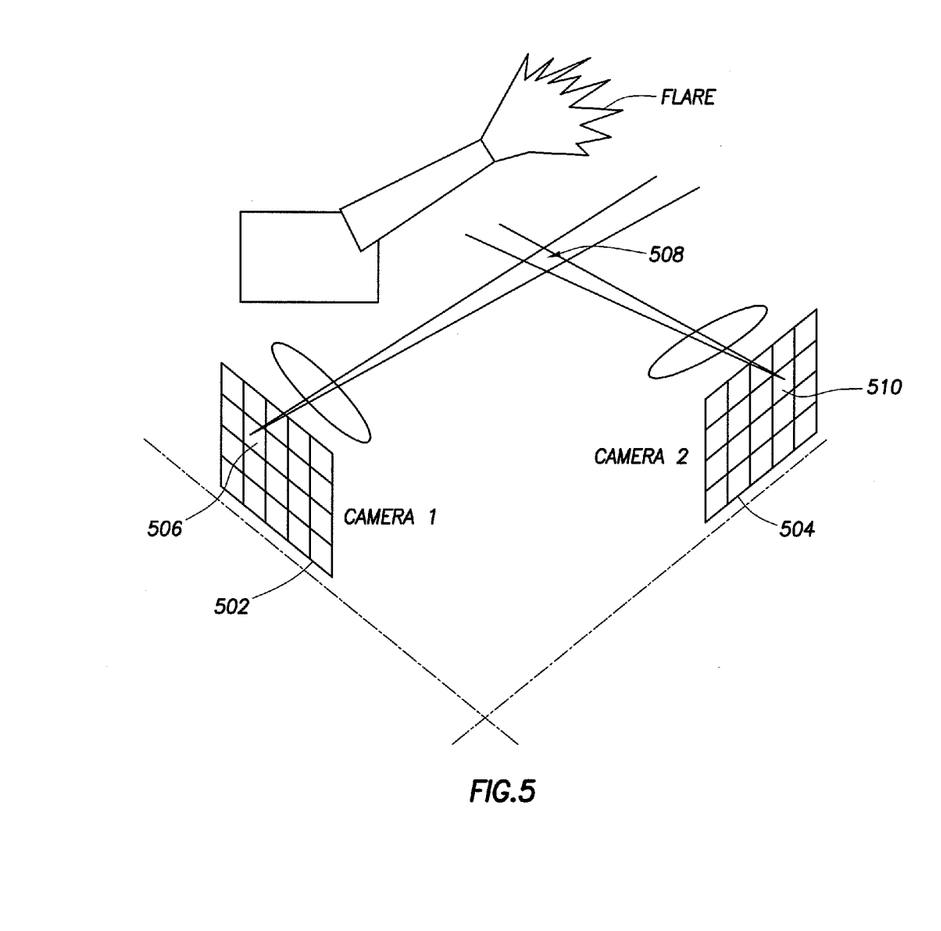
FIG. 5 shows a system for hyperspectral imaging using two cameras in accordance with an exemplary embodiment of the present invention.

FIG. 5 depicts an exemplary embodiment where two hyperspectral cameras 502, 504 are used to monitor the area where flaring will occur or is occurring. For simplicity, it is assumed that each camera captures the same number of pixels over identical pixel arrays. In one embodiment the central axes of the cameras are roughly orthogonal to each other as shown in FIG. 5. Each pixel in each image corresponds to a solid angle in space. That is, light within a specific solid angle in space impinges on a specific pixel, as shown in FIG. 5.

Thus, when hyperspectral imaging is applied to a specific pixel element to determine the amount of a hydrocarbon gas, such as $CO_2$ in space, it is integrating over the entire path of the optical cone visible to that pixel. As would be appreciate by those of ordinary skill in the art, with the benefit of this disclosure, if two cameras are mounted so as to view the flare and the area around it, and if their central axes are close to perpendicular (or at least not parallel), then a given pixel (e.g. 506) in one camera is likely to share a unique common volume 508 element with a second given pixel (e.g. 510) in the other camera. Each pixel does not view this common volume element to the exclusion of the rest of its solid angle of view. Therefore, in one embodiment, observations begin prior to the flaring process. After flaring begins, the hydrocarbon gasses will begin to evolve in a cloud around the flare. It will first be detected in some measurable quantity in one or more particular pixels at a particular time in the first camera 502. Simultaneously, it will appear in one or more pixels in the second camera 504. At this instant, the emission cloud is confined to the common volume viewed by the pixels in the two cameras 502, 504. The amount of a particular gas seen in a particular pixel can be estimated from the intensity of the appropriate hyperspectral components. If these intensities are summed for the images in the first camera 502 and compared with the similar sum from the second camera 504, they should be comparable because at this stage, the cloud is well contained within the field of view of both cameras. The two values can be averaged to provide a better estimate of the total amount of the particular gas, such as CO2. Since the volume occupied is known, the density of the gas can also be estimated. Specifically, a common component viewed in a given pixel (e.g., pixel A) in one camera may be viewed with the same solid angle by the other camera, where it appears in pixel B. Using simple geometry, the pixel locations can be used to determine where in three-dimensional space the solid angles visible to the two pixels intersect. Because the volume of intersection is typically closer to one camera than to another, the cross-sectional areas of the cone defined by these solid angles are likely to be different, even with identical cameras. Hence, a more accurate intensity comparison can be made by multiplying each intensity by the square of the distance of the corresponding pixel in which that intensity was measured to the point of intersection.

With successive frames, the cloud will be seen to grow, and its volume and density can be estimated as before until such time that the cloud moves beyond the range of the cameras

502, 504. From this point on, assuming that gas is still being flared, one can only directly measure the amount of the particular gas, such as CO2, present in the volume investigated by both cameras. However, from the earlier images, it is possible to estimate how rapidly the cloud is growing by comparing the images from the cameras 502, 504 over time. If this is assumed to be uniform, then the total volume emitted over any given time can be estimated.

Typically, inhomogeneties will spontaneously arise in the gas density. These will be short-lived, but since their position can be tracked using the cameras 502, 504, they can be used to estimate gas velocity.

In another embodiment (not shown), a single camera may be used. In this embodiment, one can obtain information about the rate of production of a particular gas, such as $CO_2$, and the volume produced over a given period of time. It is again assumed that images are taken continuously and that the image time history includes times when there was no flare. As soon as the particular gas is detected in a given pixel at a measurable level, the amount of the particular gas in the volume subtended by the light cone seen by that pixel is known. This can be tracked with time across the image plane until a more or less steady state is reached, at which time an estimate can be made of the rate of production of the particular gas, As would be appreciated by those of ordinary skill in the art, with the benefit of this disclosure, in one embodiment, a hyperspectral light source may be used to improve the hyperspectral imaging. Specifically, the hyperspectral light source may improve image quality by illuminating a region of interest whose hyperspectral image is to be captured by the cameras 502, 504.

Figure 6:
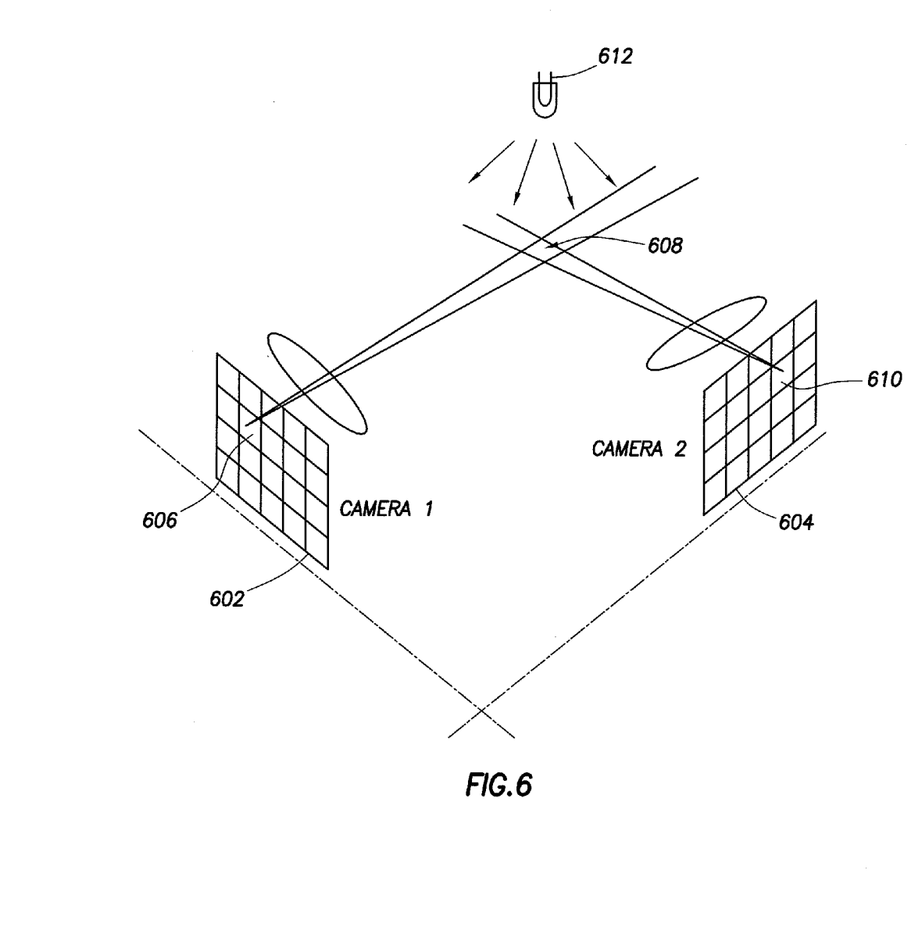
FIG. 6 shows a system for hyperspectral imaging using two cameras in a subsea environment in accordance with an exemplary embodiment of the present invention.

In another exemplary embodiment as shown in FIG. 6, hyperspectral imaging may be used in a subsea environment to obtain a wide area view of an area or equipment of interest. The HICM may be mounted by any suitable means at a desirable location in the subsea environment. As would be appreciated by those of ordinary skill in the art, with the benefit of this disclosure, any materials that leak in the subsea environment will probably have a higher temperature than the ambient and can therefore be identified using a thermal or chemical contrast obtained by hyperspectral imaging.

In accordance with an embodiment of the present disclosure, two cameras 602, 604 may be used in the same manner discussed above in conjunction with FIG. 5. Specifically, once the cameras 602, 604 are positioned so that their central axis are close to perpendicular (or at least not parallel), then a given pixel (e.g. 606) in one camera is likely to share a unique common volume 608 element with a second given pixel (e.g. 610) in the other camera.

In one aspect, when applied in the subsea environment, one can see the particles by light scattering and the spectroscopic contrast between oil and water can be used to distinguish between the two.

In another exemplary embodiment, hyperspectral imaging may be used to differentiate between biologically processed (biodegraded) or altered oil and unaltered oil. Biologically processed or altered oil may include, for example, oil that is the result of excretion of organisms in the water that consumed the oil whereas unaltered oil refers to oil residues in the water that may have entered the water from a subsea hydrocarbon bearing region. Specifically, the methods and systems disclosed herein may be used to identify the oil that has entered the water from, for example, a leak at a subsea wellbore. Specifically, the biodegradation of oils may be detectable by detecting one or more of the following using the methods and systems disclosed herein: (1) an increase in asphaltenes; (2) a decrease in saturates (bacterial food) in the oil; and/or (3) a general increase in Sulfur compounds, most notably, Hydrogen Sulfide and/or Mercaptains. Moreover, biodegradation may increase presence of caboxylic acids and phenols in the water, thereby increasing the acidity of the oil.

In another exemplary embodiment, hyperspectral imaging may be used to identify the source of a leak in a subsea environment. As a material leaks in a subsea environment, it may develop a temperature gradient, with the temperature of the material being highest at the leak and the material cooling down as it gets away from the leak. This phenomena can be used to develop a temperature gradient for the leaking material of interest to pinpoint the location of the leak. Specifically, the hyperspectral image of a region of interest may be used to obtain this temperature gradient, thereby directing one to the source of the leak. In another exemplary embodiment, hyperspectral imaging may be used in exploration to determine whether any oil residues in a particular region are seeping through or have been biodegraded. Additionally, hyperspectral imaging may be used for fingerprinting to determine if the oil is leaking from another platform or is seeping from the ocean floor.

Observations using hyperspectral imaging may be carried out either using direct light or scattered light. In one exemplary embodiment, the observations may be made with two or more cameras 602, 604 oriented so as to have different views of the area of interest. Further, in one exemplary embodiment, one or more light sources 612 may be used so as to illuminate the area of interest with light of uniform intensity, although variations within a certain limit, for example up to 90% may be permissible.

The techniques discussed above with reference to FIG. 5 are also applicable in the subsea environment. However, whereas the provision of a hyperspectral light source was optional in FIG. 5, it is highly desirable to provide suitable lighting for imaging in the subsea environment. Thus, the techniques discussed in conjunction with FIG. 5 can be adapted to identify the onset of influx of a material, track its rate of movement, volume, and density. The specific material being tracked may be identified by hyperspectral imaging.

In one exemplary embodiment, hyperspectral imaging may be used to calculate the weight of the hydrocarbon gas that has evolved from a particular region of interest. This region of interest may be, for example, all or part of a drilling rig, such as the shale shaker or the mud pits. Additionally, because the hyperspectral imaging can provide a broad view of a region and/or equipment of interest, it allows for a stand-off distance which will protect the operator from any harmful materials that may be leaking from the particular area or equipment of interest.

In one exemplary embodiment, temperature contrast information may be obtained in the infrared region of the spectrum for one or more gasses of interest. Such readings are particularly useful if the ambient temperature does not interfere with the readings. Further, the systems and methods disclosed herein may be used for a passive detection mode or an active detection mode of a particular region or equipment of interest. A passive detection method refers to a general monitoring of an area of interest while an active detection mode entails actively using a tracer or other materials to analyze a particular subsystem in the region of interest. Each of these methods is discussed below.

Subterranean operations may be performed on a large field. Such field may produce a large amount of hydrocarbons. It is desirable to be able to monitor the entire field and pin point any leaks to the atmosphere from the field or from a portion thereof. The area being monitored for leak detection may be as large as several square miles, it may be a pipeline, or any equipment used in the oil field (e.g. the rig, refinery, etc). Hyperspectral imaging may be used to obtain a number of useful pieces of information, such as, for example, (1) if there is a leak from the particular area or equipment of interest; (2) if there is a leak, an identification of the material that is leaking; and (3) an identification of the location within the area or equipment of interest where the leak is occurring. This method may be applicable for environmental, safety, maintenance, or other compliance monitoring of the oil field, part thereof, pipelines, or other equipment of interest.

In accordance with an embodiment of the present disclosure, the hyperspectroscopy device may be mounted on a pole and may scan the area of interest or it may be otherwise arranged to scan the area of interest. In one embodiment, an illumination source may be used to improve the quality of images obtained by hyperspectral imaging. In one exemplary embodiment the illumination source and/or the hyperspectroscopy imaging device may be moved to focus on a particular area within the area of interest or search for particular materials that may be of interest at a given time. In another exemplary embodiment, a particular illumination source may be used for detection of a particular material of interest in the region being imaged.

In another mode of operation, the methods and systems disclosed herein may be used for active detection. In this embodiment, the system of interest (e.g., pipeline, frac truck, or any other equipment of interest) may be pressurized with a tracer. The tracer may be any suitable materials with suitable characteristics. For instance, the tracer material may be a material that is easily detected and/or not otherwise present in the area being imaged. Once the desired system is pressurized, hyperspectral imaging may be used to see if there are any leaks from the system by imaging the device or region of interest for the tracer. In one embodiment the tracer may be $CO_2$. Additionally, hyperspectral imaging may be used to pin point the location of any leaks so that they can be remedied. The operator may select the appropriate tracer for a particular application. In one exemplary embodiment, this active leak detection method may be used to identify leaks from a Blow Out Preventer ("BOP").

In one exemplary embodiment, the systems and methods disclosed herein may be used in conjunction with underbalanced drilling to monitor a Rotating Control Device ("RCD") for gas leaks when the rubber seal inside the RCD wears out.

In another exemplary embodiment, the hyperspectral imaging device may be designed as a handheld device. A user may then use this handheld device to focus on a particular equipment, region, or portion thereof to identify any leaks as discussed above. Specifically, the HICM may be a handheld device. The user may then capture a hyperspectral image of a device, a subsystem and/or a particular region of interest and analyze that image in the manner discussed above to identify presence of a particular material of interest.

As discussed above, total volume, flow rate, and density of a material may be measured using hyperspectral imaging. If density is known as a function of space and time, this can be used to calculate dilution as a function of space and time and the rate of diffusion of a constituent that is being monitored may also be determined.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for analyzing gaseous emissions from a subterranean formation comprising:
    positioning a hyperspectral image capturing mechanism to monitor an area of interest,
    wherein the hyperspectral image capturing mechanism comprises two cameras,
    wherein central axis of the two cameras are substantially orthogonal and wherein the two cameras capture images of at least one unique common volume;
    detecting presence of one or more materials of interest in the area of interest using the hyperspectral image;
    quantifying amount of the one or more materials of interest in the area of interest;
    estimating amount of the one or more materials of interest in the at least one unique common volume; and
    determining the density of the one or more materials of interest using the amount of the one or more materials of interest in the at least one unique common volume and the volume of the at least one unique common volume.

2. The method of claim 1, wherein detecting presence of one or more materials of interest in the area of interest comprises comparing a background image with an image captured after the one or more materials of interest are emitted into the area of interest.

3. The method of claim 1, further comprising estimating how fast the one or more materials of interest are being emitted by monitoring rate of change of the amount of the one or more materials of interest in the area of interest.

4. The method of claim 1, further comprising providing a hyperspectral light source to illuminate at least a portion of the area of interest.

\* \* \* \* \*